United States Patent [19]

Tateoka et al.

[11] Patent Number: 4,682,316
[45] Date of Patent: Jul. 21, 1987

[54] OPTICAL INFORMATION PROCESSING APPARATUS FOR LIGHT BEAM FOCUS DETECTION AND CONTROL

[75] Inventors: Masamichi Tateoka, Yokohama; Hideaki Yano, Kokubunji, both of Japan

[73] Assignee: Canon Kabushiki Kaisha, Tokyo, Japan

[21] Appl. No.: 736,342

[22] Filed: May 21, 1985

[30] Foreign Application Priority Data

May 29, 1984 [JP] Japan .................. 59-110206

[51] Int. Cl.$^4$ .............................................. H04N 7/00
[52] U.S. Cl. ...................................... 369/46; 250/201
[58] Field of Search ...................... 369/43–46; 250/201 DF, 237 R, 237 G

[56] References Cited

U.S. PATENT DOCUMENTS

| | | | |
|---|---|---|---|
| 3,544,801 | 12/1970 | Dyck | 250/237 R |
| 3,567,855 | 3/1971 | Hamisch | 369/106 X |
| 4,023,033 | 5/1977 | Bricot et al. | |
| 4,079,248 | 3/1978 | Lehureau et al. | |
| 4,103,998 | 8/1978 | Nakazawa et al. | 250/237 G X |
| 4,450,547 | 5/1984 | Nakamura et al. | 250/210 DF X |
| 4,517,666 | 5/1985 | Ando | 250/201 DF X |

FOREIGN PATENT DOCUMENTS

| | | | |
|---|---|---|---|
| 4749622 | 5/1968 | Japan | 250/237 R |
| 57-18034 | 1/1982 | Japan | 369/45 |
| 2104687 | 3/1983 | United Kingdom | 369/46 |

*Primary Examiner*—Aristotelis M. Psitos
*Attorney, Agent, or Firm*—Fitzpatrick, Cella, Harper & Scinto

[57] ABSTRACT

An optical information processing apparatus comprising record/reproduction devices for irradiating a focused light beam onto a track on a record medium to record or reproduce information tracking control devices for precisely directing the irradiated light beam to the track split devices for splitting at least a portion of a reflected or transmitted light beam of the irradiated light beam from the record medium into two light beams first screen devices for screening a center area of one of the split light beams across a width of the track second screen devices for screening a peripheral area of the other of the split light beams across the width of the track and detection devices for comparing light intensities of the two light beams transmitted without being screened by said first and second screen devices to detect a focusing state of the irradiated light beam to the record medium.

7 Claims, 9 Drawing Figures

OPTICAL INFORMATION PROCESSING APPARATUS FOR LIGHT BEAM FOCUS DETECTION AND CONTROL

BACKGROUND OF THE INVENTION

1. Field of the Invention

The present invention relates to an optical information processing apparatus for irradiating a focused light beam on a recording medium to record or reproduce information. In the present invention, the term optical information processing apparatus includes a record-only apparatus, a reproduction-only apparatus and a recording and reproducing apparatus.

2. Description of the Prior Art

In the past, an optical disk memory and a magneto-optical disk memory have been known optical information processing apparatus. In such optical information processing apparatus, a light beam modulated by an information signal irradiates a record medium. In the optical disk, a reflection factor at an area irradiated by the light beam changes, and in the magneto-optical disk, a magnetization direction at an area irradiated by the light beam changes. In reproducing the information, a light beam of a predetermined intensity is irradiated to the information bearing record medium and a reflected light or transmitted light modulated by the information is photo-electrically converted by a photo-sensor.

Such a record medium is characterized by a high information recording density. A track width of the information and a spacing between the tracks are very narrow. As a result, in the optical information processing apparatus, a focusing control for aligning a focus point of the light beam to a surface of the record medium and a tracking control for precisely directing the light beam onto the track on the record medium are essential. A focus point detection method used in the prior art apparatus of this type is explained below.

A method used in an apparatus of FIG. 1 is usually called an astigmatism method. A light beam (which vibrates horizontally to a plane of the drawing and is a p-polarized to a polarized beam splitter 3) emitted from a semiconductor laser 1 is collimated by a collimeter lens 2, passes through the polarized beam splitter 3, circularly polarized by a λ/4 plate 4 and focused onto a record medium 6 by an object lens 5. The light beam is reflected by the record medium 6, passes through the object lens 5, s-polarized by the λ/4 plate 4 and reflected by the polarized beam splitter 3. The light is focused by a condenser lens 7 and a cylindrical lens 8. The cylindrical lens 8 has a unidirectional focusing function. As the position of the record medium 6 vertically shifts, a shape of the focused light beam deforms orthogonally with respect to an in-focus position b, as shown by a and c. The deformation of the shape is detected by a four-division photo-detector (not shown) to produce a focusing error signal by which the focusing control is effected.

In this method, since the photo-detector must be precisely positioned in two axial directions in a plane normal to an optical axis, the positioning of the photo-detector is difficult to attain. If the object lens is moved perpendicularly to the optical axis for tracking control, the focused light beam is also moved perpendicularly to the optical axis and a focusing error is produced. The complex cylindrical lens is required for the astigmatism. This leads to an increase in cost.

FIG. 2 shows a focus point detection method called a knife edge method. A construction on the left of a focusing lens is similar to that shown in FIG. 1 and hence it is omitted in FIG. 2. A light beam separated from an incident light by the polarized beam splitter is focused to a position 11 by the focusing lens 9. A screen plate for rendering the light beam asymmetric is arranged between the focusing lens 9 and the position 11. If an in-focus state of the incident light changes on the record medium, a light beam directed to the focusing lens changes from the collimated light beam to a focused light beam or a scattering light beam. Accordingly, the shape of the focused light beam at the position 11 changes among a', b' and c' where b' represents an in-focus state. The deformation of the shape is detected by a two-division photo-detector (not shown) to produce a focus point error signal by which the focusing control is effected.

In this method, since the focus point is detected by the change of shape of the light beam, the photo-detector must be precisely aligned uniaxially in a plane normal to the optical axis. Thus, the positioning of the photo-detector is hard to attain.

SUMMARY OF THE INVENTION

It is an object of the present invention to provide an optical information processing apparatus which allows easy positioning of light beam detection means and can precisely detect a focus point by the tracking control without focusing error.

The above object of the present invention is achieved by an optical information processing apparatus comprising: record/reproduce means for irradiating a focused light beam onto a track on a record medium to record or reproduce information; tracking control means for precisely directing the irradiated light beam to the track; split means for splitting at least a portion of a reflected or transmitted light beam of the irradiated light beam from the record medium into two light beams; first screen means for screening a center area of one of the split light beams across a width of said track; second screen means for screening a peripheral area of the other of the split light beams across the width of said track; and detection means for comparing light intensities of the two light beams transmitted without being screened by said first and second screen means to detect a focusing state of the irradiated light beam to said record medium.

DETAILED DESCRIPTION OF THE PREFERRED EMBODIMENTS

Figure 1:
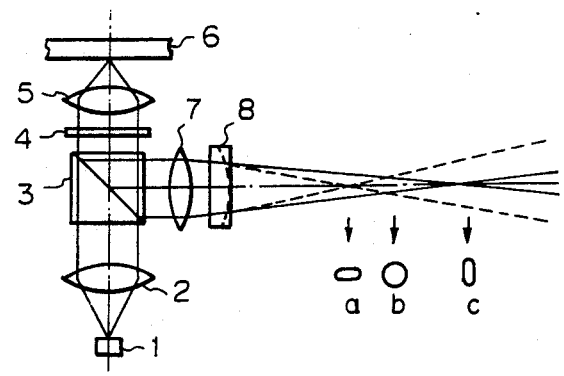
FIG. 1 illustrates one focus point detection method in a prior art optical information processing apparatus.
Figure 2:
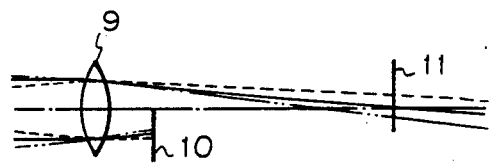
FIG. 2 illustrates another focus point detection method in the prior art optical information processing apparatus.
Figure 3:
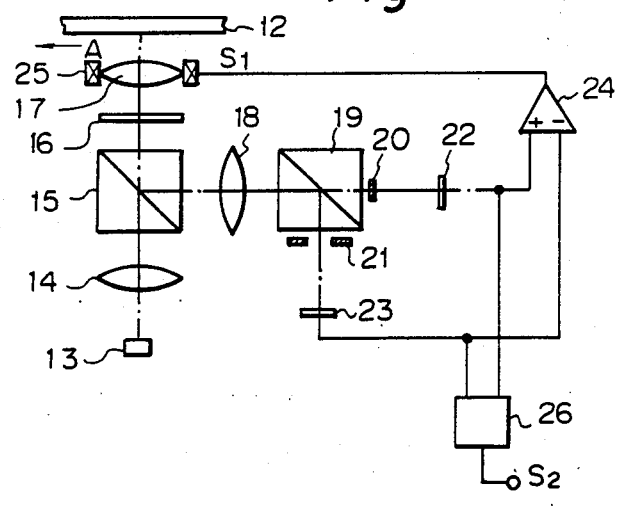
FIG. 3 shows a first embodiment of an optical information processing apparatus of the present invention.
Figure 4:
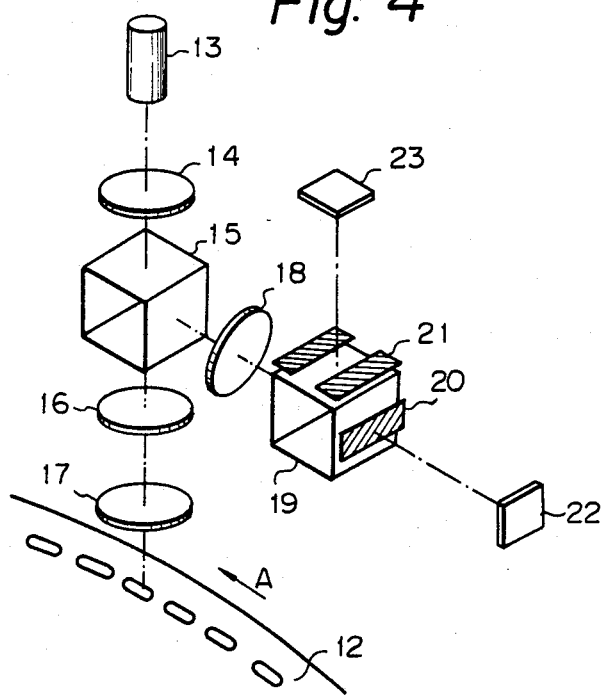
FIG. 4 is a perspective view showing an arrangement of optical elements in the apparatus of FIG. 3, FIGS. 5(a), 5(b) and 5(c) are sectional views illustrating a principle of focus point detection in the apparatus of FIG. 3.

FIG. 3 shows a first embodiment of an optical information processing apparatus of the present invention and FIG. 4 is a perspective view showing an arrangement of optical elements in the apparatus of FIG. 3. A track on a record medium 12 is moved in a direction A. A light (p-polarized) emitted from a semiconductor laser 13 is collimated by a collimeter lens 14 to a collimated light, which passes through a polarized beam splitter 15, is circularly polarized by a λ/4 plate 16, is focused onto the record medium 12 by an object lens 17 to write or read information. A reflected light from the record medium 12 again passes through the object lens 17, is s-polarized by the λ/4 plate 16, is reflected by the polarized beam splitter 15 and is directed to a focusing lens 18. A focused light beam from the focusing lens 18 is split into two light beams by a beam splitter 19. One of the split beams is screened by an elongated screen plate 20 at a center area of the light beam across a track width. The other split beam is screened by a screen plate 21 having a slit-shaped aperture at opposite ends of a peripheral area of the light beam across the track width. The two light beams which are not screened by the screen plates 20 and 21 are directed to detectors 22 and 23, respectively.

The detectors 22 and 23 photo-electrically convert the light beams and produce detection signals representing light intensities. The outputs are compared by a differential amplifier 24 which produces a focus point error signal $S_1$, which in turn is applied to a drive mechanism 25 of the object lens 17 so that the light beam transmitted through the object lens 17 is always focused onto the record medium 12. In reproducing the information, the outputs of the detectors 22 and 23 are applied to an adder 26 which produces a reproduced signal $S_2$.

Figure 5C:
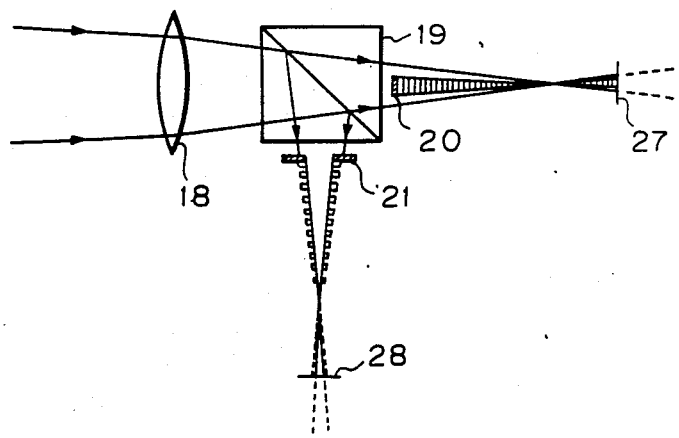
Figure 5:
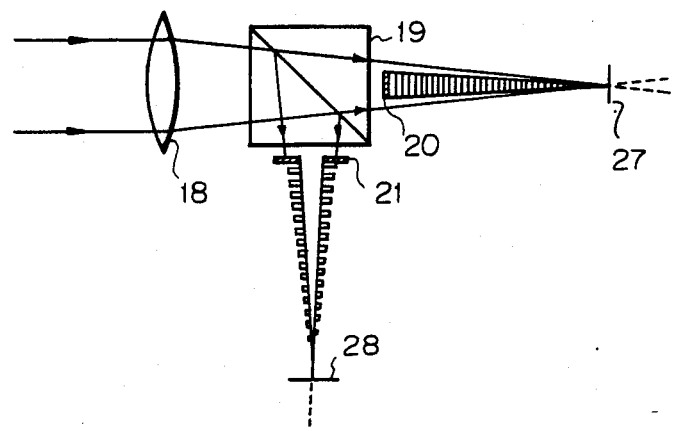
Figure 5B:
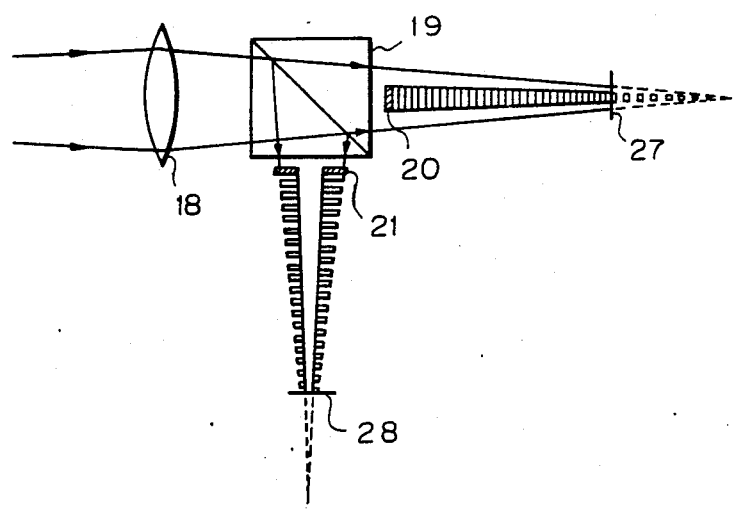
Figure 6:
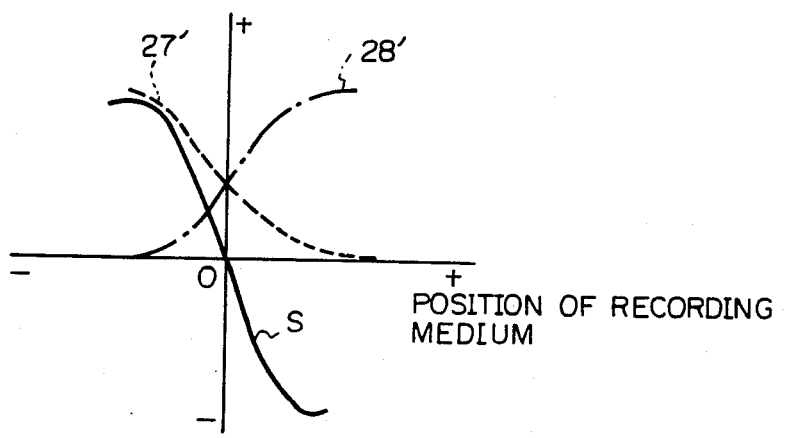
FIG. 6 shows an output of a detector in the apparatus of FIG. 3.

FIGS. 5(a), 5(b) and 5(c) show a principle of the focus point detection in the present invention. In the first embodiment described above, when the object lens 17 is in the in-focus state on the record medium 12, the focused light beam transmitted through the focusing lens 18 is split by the beam splitter 19, portions thereof are screened by the screen plates 20 and 21 and the split beams are focused at focus points 27 and 28, respectively. When the focus point of the object lens is behind the record medium, that is, when the object lens is too close to the record medium, the reflected light scatters and a light intensity screened by the screen plate 21 increases while a light intensity screened by the screen plate 20 decreases, as shown in FIG. 5(b). As a result, a light intensity reaching the focus point 27 increases relative to a light intensity reaching the focus point 28. On the other hand, when the focus point of the object lens is in front of the record medium, that is, when the object lens is too far from the record medium, the reflected light converges the light intensity screened by the screen plate 21 decreases while the light intensity screened by the screen plate 20 increases, as shown in FIG. 5(c). As a result, the light intensity reaching the focus point 28 increases relative to the light intensity reaching the focus point 27. Accordingly, the outputs of the detectors arranged at the focus points 27 and 28 of the light beams are represented by 27' and 28' in FIG. 6, in which as abscissa represents a position of the record medium surface to the in-focus position and an ordinate represents the output of the detector. The defocus state can be detected by a difference S between the outputs 27' and 28'.

In the present invention, strict positioning of the detectors is not required so long as the light beam is not deviated from the photo-sensing plane. Accordingly, the positioning of the detection means is readily attained. Further, since the screen plate has a uniform slit in the track width direction, the focusing error is not produced even if the light beam is swung in the track width direction by the tracking control and precise focusing control is attained.

Figure 7:
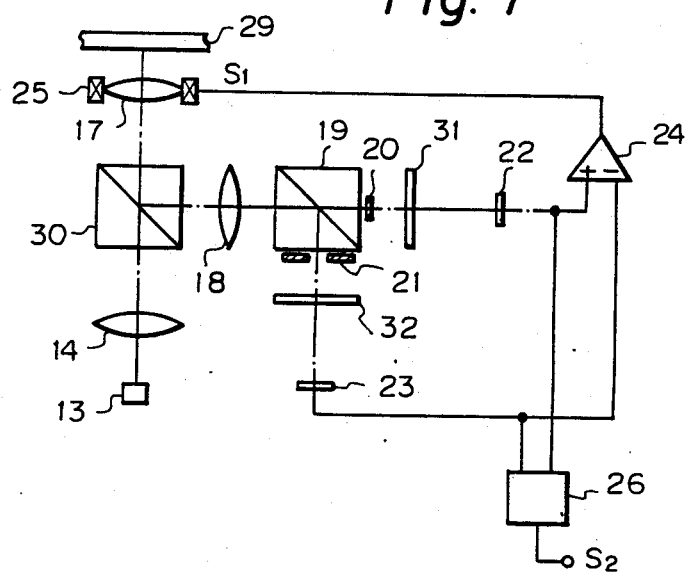
FIG. 7 shows a second embodiment of the present invention which is applied to a magneto-optical reproducing apparatus.

FIG. 7 shows a second embodiment of the present invention which is applied to a magneto-optical record reader. The like elements to those shown in FIG. 3 are designated by the like numerals and detailed explanation thereof is omitted. A light beam irradiated to a magneto-optical record medium 29 is modulated by a magnetic Kerr effect so that a polarization plane thereof is rotated (Kerr rotation) and a reflected light is directed to a polarized beam splitter 30. The polarized beam splitter 30 is designed to have p-polarization transmittion factor of 70%, p-polarization reflection factor of 30% and s-polarization reflection factor of 98% in order to apparently amplify a Kerr rotation angle of the reflected light. The reflected light is amplified by the polarized beam splitter 30, reflected thereby, split by the beam splitter 19 and directed to analyzers 31 and 32 through the screens 20 and 21. Thus, the rotation of the polarization angle is converted to the change in the light intensity, which is detected by the detectors 22 and 23. Accordingly, the focus point error signal is detected as is done in the embodiment of FIG. 3 so that the object lens 17 is always kept in an in-focus state to the magneto-optical record medium 29.

The present invention is applicable to various apparatus other than those shown in the embodiments. The screen plates in the embodiments need not completely screen the light but they may attenuate the light by light absorbing elements such as filters. The present invention may also be applied to a transmission type apparatus which detects a transmission light from the record medium to reproduce information or effect focusing control.

What is claimed is:

1. An optical information processing apparatus comprising:
   record/reproduction means for irradiating a focused light beam onto a track on a record medium to record or reproduce information;
   tracking control means for precisely directing the irradiated light beam to the track;
   split means for splitting at least a portion of a reflected or transmitted light beam of the irradiated light beam from the record medium into two light beams;
   first screen means for screening a center area of a first of the split light beams across a width of said track so as to transmit a peripheral area of the first split light beam;
   second screen means for screening a peripheral area of the second of the split light beams across the width of said track so as to transmit a center area of the second split light beam; and
   detection means for comparing light intensities of the two light beams transmitted without being screened by said first and second screen means to detect a focusing state of the irradiated light beam with respect to said record medium.

2. An optical information processing apparatus according to claim 1, further comprising focusing control means for precisely focusing the irradiated light beam onto the record medium in accordance with a signal from said detection means.

3. An optical information processing apparatus according to claim 1, wherein said record/reproduction means includes a light source and an object lens for focusing the light beam emitted from the light source onto the record medium.

4. An optical information processing apparatus according to claim 1, wherein said split means includes a beam splitter.

5. An optical information processing apparatus according to claim 1, wherein said first screen means includes an elongated screen plate along a track width direction.

6. An optical information processing apparatus according to claim 1, wherein said second screen means includes a screen plate having an elongated slit along a track width direction.

7. An optical information processing apparatus according to claim 1, wherein said detection means includes two detectors for detecting said two light beams, respectively, and a differential amplifier for for differentiating outputs of said two detectors.

* * * * *